US010616811B2

(12) United States Patent
Li (10) Patent No.: US 10,616,811 B2
(45) Date of Patent: Apr. 7, 2020

(54) METHODS AND APPARATUS FOR USING A COMMUNICATION PROTOCOL BASED ON A WIRELESS NETWORK (71) Applicant: Lenovo (Beijing) Limited, Beijing (CN)

(72) Inventor: Yakun Li, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 0 days.

(21) Appl. No.: 15/452,572

(22) Filed: Mar. 7, 2017

(65) Prior Publication Data
US 2017/0257808 A1 Sep. 7, 2017

(30) Foreign Application Priority Data
Mar. 7, 2016 (CN) .......................... 2016 1 0128447

(51) Int. Cl.
H04W 4/00 (2018.01)
H04W 36/00 (2009.01)
H04W 36/14 (2009.01)
H04W 4/60 (2018.01)
H04W 76/20 (2018.01)
H04W 84/04 (2009.01)
H04W 84/12 (2009.01)
H04W 88/04 (2009.01)

(52) U.S. Cl.
CPC ............. *H04W 36/14* (2013.01); *H04W 4/60* (2018.02); *H04W 76/20* (2018.02); *H04W 84/042* (2013.01); *H04W 84/12* (2013.01); *H04W 88/04* (2013.01)

(58) Field of Classification Search
CPC ..... H04W 8/183; H04W 60/00; H04W 48/18; H04W 36/30; H04W 36/04; H04W 16/14; H04W 72/04; H04W 28/08
USPC ....... 455/432.1, 435.1–435.3, 437, 444, 448, 455/450, 452.1–452.2, 453
See application file for complete search history.

(56) References Cited

U.S. PATENT DOCUMENTS

2006/0072532 A1* 4/2006 Dorenbosch .......... H04L 12/185
370/342
2010/0008258 A1* 1/2010 Ji ............................ H04W 8/26
370/254
(Continued)

FOREIGN PATENT DOCUMENTS

CN 103906140 A 7/2014
CN 104349401 A 2/2015
(Continued)

Primary Examiner — Matthew W Genack
(74) Attorney, Agent, or Firm — Kunzler Bean & Adamson (57) ABSTRACT Methods and apparatus for using a communication protocol based on a wireless network are described herein. Some methods include detecting a wireless connection between a first electronic device and a second electronic device, determining if the second electronic device is connected to a cellular network, such that the first electronic device connects to the cellular network via the second electronic device, and responsive to determining that the second electronic device is connected to the cellular network, adjusting a communication protocol of the wireless connection between the first electronic device and the second electronic device. Apparatus and computer program products for performing the above methods are also described herein.

20 Claims, 2 Drawing Sheets (56) References Cited

U.S. PATENT DOCUMENTS

| | | | | |
|---|---|---|---|---|
| 2012/0084187 | A1* | 4/2012 | Sperling | G06Q 30/04 |
| | | | | 705/34 |
| 2012/0311176 | A1* | 12/2012 | Dellinger | H04L 69/18 |
| | | | | 709/232 |
| 2013/0039275 | A1* | 2/2013 | Patil | H04W 48/20 |
| | | | | 370/328 |
| 2014/0226512 | A1* | 8/2014 | Kosugi | H04W 24/00 |
| | | | | 370/252 |
| 2015/0172354 | A1* | 6/2015 | Coppola | H04L 65/80 |
| | | | | 709/203 |
| 2015/0195836 | A1* | 7/2015 | Malkin | H04L 47/14 |
| | | | | 370/329 |
| 2016/0100308 | A1* | 4/2016 | Bertz | H04L 65/4076 |
| | | | | 709/217 |
| 2016/0254916 | A1* | 9/2016 | Miyake | H04L 9/3263 |
| | | | | 713/175 |

FOREIGN PATENT DOCUMENTS

| | | |
|---|---|---|
| CN | 104869621 A | 8/2015 |
| CN | 105007602 A | 10/2015 |

* cited by examiner

METHODS AND APPARATUS FOR USING A COMMUNICATION PROTOCOL BASED ON A WIRELESS NETWORK

FIELD

The present disclosure relates to communication technologies and, in particular, to methods and apparatus for using a communication protocol based on a wireless network.

BACKGROUND

With the development of information interaction technology, more and more public places provide a Wireless Local Area Network (WLAN) to access the Internet, which can be referred to as a wireless hotspot. In addition, some mobile devices can act as the provider of a wireless hotspot. For instance, a smartphone can be used as a wireless hotspot by sharing its bandwidth in a cellular network to provide access to the Internet to other devices that can communicate (e.g., via WiFi) with the smartphone. In other words, the smartphone may access the Internet using a cellular network and one or more other devices can "piggyback" on the smartphone to gain access to the Internet via the cellular network.

While prior techniques may enable various devices to access the Internet via another device providing a wireless hotspot, at least some prior techniques can experience a variety of technical problems or issues. An example technical problem, among other example technical problems, that can be experienced by at least some prior techniques includes a client device (e.g., a device that is using another device as a wireless hotspot) utilizing a relatively large amount or portion of the bandwidth or data traffic of a host device (e.g., a device that is providing a wireless hotspot). Using a large amount or portion of the bandwidth of a device providing a wireless hotspot can result in loss of throughput, dropped connections, latency issues, reliability issues, and/or other performance issues, etc., among other example technical problems.

SUMMARY

Various embodiments described herein provide methods and systems for using a communication protocol based on a wireless network. Some innovative embodiments provide methods that include detecting a wireless connection between a first electronic device and a second electronic device, determining if the second electronic device is connected to a cellular network, such that the first electronic device connects to the cellular network via the second electronic device, and responsive to determining that the second electronic device is connected to the cellular network, adjusting a communication protocol of the wireless connection between the first electronic device and the second electronic device.

Various innovative embodiments provide apparatus including a processor and a communication module coupled to the processor. The processor is operable to detect a wireless connection between the communication module and an electronic device, determine if the communication module is connected to a cellular network, such that the communication module connects to the cellular network via the electronic device, and responsive to a determination that the communication module is connected to the cellular network, adjust a communication protocol of the wireless connection between the communication module and the electronic device.

Further innovative embodiments provide computer program products including a computer-readable storage medium including program instructions embodied therewith. The program instructions are executable by a processor of a first electronic device to cause the processor to detect a wireless connection between the first electronic device and a second electronic device, determine if the second electronic device is connected to a cellular network, such that the first electronic device connects to the cellular network via the second electronic device, and responsive to a determination that the second electronic device is connected to the cellular network, adjust a communication protocol of the wireless connection between the first electronic device and the second electronic device.

BRIEF DESCRIPTION OF THE DRAWINGS

The foregoing and other objects, features and advantages of the present disclosure will become more apparent from the detailed descriptions of the embodiments of the present disclosure in conjunction with the drawings. The drawings are used to provide a further understanding of the embodiments of the present disclosure and constitute a part of the Description, which, together with the embodiments of the present disclosure, serve to explain the present disclosure and are not construed as a limitation to the present disclosure. Unless explicitly indicated, the drawings should not be understood as being drawn to scale. In the drawings, the same reference numerals generally represent the same components or steps. In the drawings.

DETAILED DESCRIPTION

Various embodiments described herein provide innovative methods and apparatus for processing information. Further embodiments described herein provide methods and apparatus that can solve or reduce at least some of the technical problems experienced by previous techniques that provide wireless hotspots. That is, the various embodiments described herein can at least reduce the amount of bandwidth loss in providing a wireless hotspot compared to previous techniques.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Embodiments of various methods described herein may include one or more of the following features: detecting a wireless connection between a first electronic device and a second electronic device, determining if the second electronic device is connected to a cellular network, such that the first electronic device connects to the cellular network via the second electronic device, and responsive to determining that the second electronic device is connected to the cellular network, adjusting a communication protocol of the wireless connection between the first electronic device and the second electronic device.

In some embodiments, adjusting the communication protocol includes adjusting a network property of the first electronic device. In further embodiments, adjusting the network property includes replacing a first network property providing a first communication protocol with a second network property providing a second communication protocol. The second communication protocol, in one embodiment, may consume less bandwidth than the first communication protocol.

The method, in one embodiment, further includes launching a first application program in the first electronic device, determining a first network property of the first electronic device for use with the second electronic device based on the first application program, and using the first network property of the first electronic device to communicate with the second electronic device. Some embodiments, can further include replacing the first network property of the first electronic device with a second network property that consumes less bandwidth responsive to the second electronic device being connected to the cellular network.

In various embodiments, determining if the second electronic device is connected to the cellular network includes determining a network address of the first electronic device and utilizing the network address to determine if the network address corresponds to the cellular network. Utilizing the network address can include transmitting, by the first electronic device to the second electronic device, a prompt message for prompting the second electronic device to identify a type of the network to which the second electronic device is connected and receiving, by the first electronic device from the second electronic device, a response to the prompt message identifying the type of network to which the second electronic device is connected.

Embodiments of various apparatus described herein may include one or more of the following features: a processor and a communication module coupled to the processor. The processor is operable to detect a wireless connection between the communication module and an electronic device, determine if the communication module is connected to a cellular network, such that the communication module connects to the cellular network via the electronic device, and responsive to a determination that the communication module is connected to the cellular network, adjust a communication protocol of the wireless connection between the communication module and the electronic device.

In some embodiments, the communication module is configured to adjust a network property of the communication module in relation to the wireless connection between the communication module and the electronic device. In further embodiments, the communication module is configured to replace a first network property providing a first communication protocol with a second network property providing a second communication protocol. The second communication protocol, in one embodiment, may consume less bandwidth than the first communication protocol.

The processor, in some embodiments, is further configured to launch an application program and the communication module is further configured to determine a first network property for use with the electronic device based on the application program and use the first network property to communicate with the electronic device. The communication module, in one embodiment, is configured to replace the first network property with a second network property that consumes less bandwidth responsive to the electronic device being connected to the cellular network.

In various embodiments, the processor is operable to determine a network address and utilize the network address to determine if the network address corresponds to the cellular network of the electronic device to which the communication module connects. Further, the communication module, in some embodiments, is configured to transmit, to the electronic device, a prompt message to prompt the electronic device to identify a type of network to which the electronic device connects and to receive, from the electronic device, a response to the prompt message identifying the type of network to which the electronic device connects.

Embodiments of various computer program products described herein may include a computer-readable storage medium including program instructions embodied therewith. The program instructions can be executable by a processor to cause the processor to detect a wireless connection between the first electronic device and a second electronic device, determine if the second electronic device is connected to a cellular network, such that the first electronic device connects to the cellular network via the second electronic device, and responsive to a determination that the second electronic device is connected to the cellular network, adjust a communication protocol of the wireless connection between the first electronic device and the second electronic device.

To better understand the various methods and apparatus described herein, various embodiments are described with reference to the accompanying drawings. It should be understood that language used in the present disclosure has been principally selected for readability and instructional purposes, and not to limit the scope of the subject matter disclosed herein. The various embodiments and any features included in the embodiments may be combined without conflict.

Figure 1:
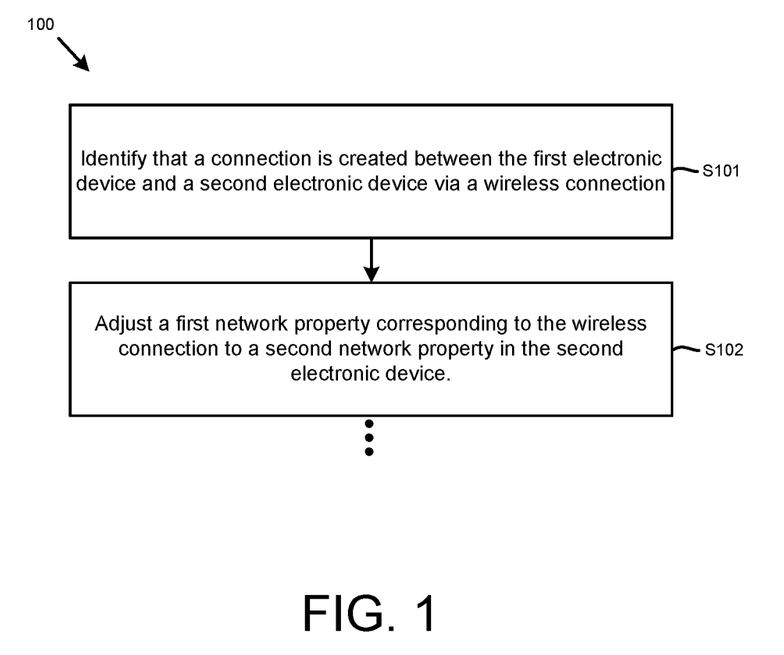
FIG. 1 is a flow diagram of one embodiment of a method for using a communication protocol based on a wireless network.

Referring to the drawings, FIG. 1 is a flow diagram of an embodiment of a method 100 for using a communication protocol based on a wireless network. At least in the illustrated embodiment, method 100 begins by detecting or identifying if/when a connection is created or has been established between a first electronic device and a second electronic device (S101). The connection may be established by any known technique including, for example, a wireless connection (e.g., WiFI) or other known technique or technique developed in the future.

The first electronic device may be any suitable electronic device that is known or developed in the future that is capable of wirelessly connecting to another electronic device. Example electronic devices include, but are not limited to a router, a smartphone, a laptop computer, a desk top computer, a tablet computer, and/or the like devices, etc., among other example electronic devices.

The second electronic device may be the same type or a different type of electronic device than the first electronic device. The second electronic device may be any suitable electronic device that is known or developed in the future that is capable of connecting to a cellular network and to one or more other electronic devices (e.g., via WiFi) to provide a wireless hotspot. Example electronic devices include, but are not limited to, a cellular telephone (e.g., a smartphone), a tablet computer, a wireless router, and the like devices, etc., among other example electronic devices. An example may include a second smartphone that shares its own mobile bandwidth or traffic with a first smartphone via a WiFi signal. In other words, the first smartphone can utilize the second smartphone to access a cellular network connected to the second smartphone.

In some embodiments, method 100 further includes adjusting a first network property corresponding to the wireless connection to a second network property in the first electronic device (S102). The first network property may the same, substantially similar to, or different from the second network property. Further, the traffic or bandwidth consumed by the first electronic device configured with the first network property operating with a first communication protocol is greater than the bandwidth consumed by the first electronic device configured with the second network property operating with a second communication protocol. In situations in which the first network property and the second network property are the same or substantially similar, the first electronic device is configured to operate with the first communication protocol and consume the same or a substantially similar amount of bandwidth.

In some situations, a smartphone (e.g., the first smartphone in the above example) accessing the Internet using a cellular network (e.g., a mobile network such as a GSM network, a CDMA network, or a 3G network, etc., among other example cellular networks) of another smartphone (e.g., the second smartphone in the above example) may consume relatively more bandwidth of the second smartphone using a first application compared to using a second application that is known to consume less bandwidth. Various method embodiments described herein address these situations.

In one embodiment, in response to detecting that the first and second electronic devices are connected (e.g., via WiFi), a first network property corresponding to the WiFi connection in the first smartphone is adjusted to the second network property that is known to consume less bandwidth than the first network property. For example, the first network property may include a first communication protocol that is known to consume a greater amount of bandwidth than a second network property in the first smartphone that includes a second communication protocol that is more efficient or uses less bandwidth than the first communication protocol. Here, the current or first network property may be switched or switch out to the second network property corresponding to the second communication protocol so that a smaller amount of bandwidth of the second smartphone is utilized by the first smartphone.

For instance, a current wired access way may be disguised as cellular data. Subsequently, a communication protocol corresponding to the cellular data may be used instead of a communication protocol corresponding to wired data. In the communication protocol corresponding to the cellular data, some of the applications in the first smartphone will run in a wired mode, which would consume less bandwidth than a cellular mode; however, a cellular mode is being used and a greater amount of bandwidth is being consumed. For example, a file may be downloaded when bandwidth of a router is used, and in contrast, the download may not be performed when cellular data is used, which can reduce the bandwidth loss that may be experienced by the second smartphone due to the first smartphone.

In one embodiment, prior to adjusting the first network property corresponding to the wireless connection to a second network property in the first electronic device, method 100 may further include obtaining the first network property corresponding to the wireless connection in the first electronic device when a first application program in the first electronic device is launched. That is, when an upper-layer application program in the first electronic device is launched, the first network property corresponding to the wireless connection in the first electronic device is obtained. For example, when a user opens "WeChat" on the first smartphone, a network property corresponding to a current WiFi connection is obtained.

In some embodiments, adjusting a first network property corresponding to the wireless connection to a second network property in the first electronic device includes: adjusting the first network property to a network property corresponding to the second communication protocol in a case where use of a cellular network of the second electronic device is identified; otherwise, the first electronic device continues to use a network property corresponding to the first communication protocol. For instance, if it is identified that the cellular network of the second electronic device is used by the first electronic device, the first network property is adjusted to a network property corresponding to the second communication protocol.

For example, a smartphone shares its own mobile bandwidth with a tablet computer by transmitting a WiFi signal.

If it is identified that the cellular network of the smartphone is used by the tablet computer, a current network property of the tablet computer is adjusted to a cellular network, such that the tablet computer enters a low bandwidth communication protocol. If it is identified that a wired network of a router is used by the tablet computer, the tablet computer may continue using a communication protocol that uses a greater amount of bandwidth because bandwidth consumed by an application on the tablet computer will not result in bandwidth loss of the router since the router is connected to a wired network. Those skilled in the art will appreciate that the communication protocol may adjust the current network property of the first electronic device further based on actual usage of the second electronic device in addition to the type of network.

Figure 2:
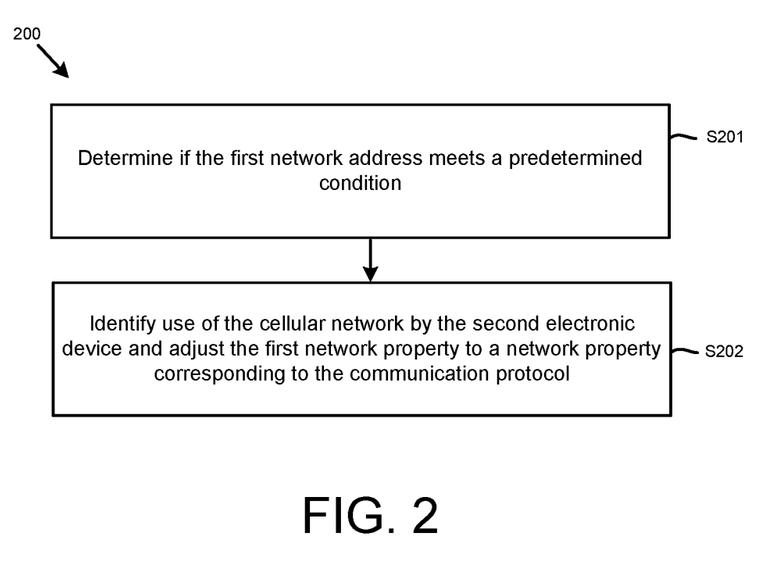
FIG. 2 is a flow diagram illustrating aspects of a process included in the method of FIG. 1.

With reference now to FIG. 2, a flow diagram 200 showing additional aspects of process S102 is shown. At least in the illustrated embodiment, process S102 begins by obtaining a network address of the second electronic device and determining if the network address meets a predetermined condition (S201). Process S102 further includes identifying or determining the use of a cellular network by the second electronic device as at least a portion of adjusting the first network property to a network property corresponding to the second communication protocol in a case where the network address meets a predetermined condition (S202).

In process S201, a network address of the second electronic device is obtained. For example, when an electronic device C is connected to WiFi of an electronic device D providing a wireless hotspot, an IP address currently allocated to the electronic device D is obtained. Subsequently, a determination whether the IP address meets a predetermined condition or has a particular characteristic is performed. As the predetermined condition is met, it is identified that a cellular network of the electronic device D is being used and a first network property in the electronic device C is adjusted to a network property corresponding to the second communication protocol (e.g., a low bandwidth communication protocol); otherwise the electronic device C may continue using the first communication protocol (e.g., a high bandwidth protocol).

By way of a non-limiting example, if the current IP address of the electronic device D is headed with "192.168.43.", it may be identified that a cellular network is not being used by the electronic device D and the electronic device C may continue using a high bandwidth communication protocol. By way of another non-limiting example, if the current IP address of the electronic device D is headed with "172.20.10.", it may be identified that a cellular network is being used by the electronic device D. In this case, the electronic device C is controlled to use a network property corresponding to a low bandwidth communication protocol. Those skilled in the art may determine the network of the first electronic device used by the second electronic device by using other network addresses according to actual requirements.

A network condition of the second electronic device currently used by the first electronic device may be identified in other ways. Specifically, one standard hotspot model is currently being produced, which can be referred to as a device 99. Once detection of a connection of the first electronic device with the device 99 is established via WiFi, an automatic or default indication that a cellular network of the device 99 is currently being used by the first electronic device, and the first network property is adjusted to a second network property corresponding to the second communication protocol.

Figure 3:
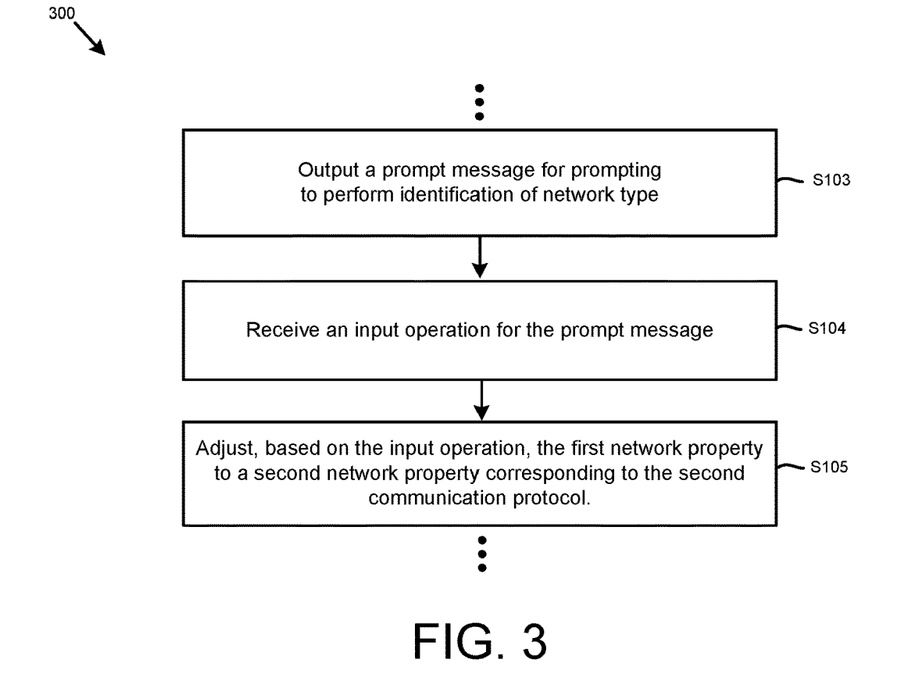
FIG. 3 is a flow diagram of additional processes in the method of FIG. 1.

With reference now to FIG. 3, a flow diagram 300 illustrating additional processes occurring subsequent to the process S101 in method 100 is illustrated. That is, subsequent to identifying that a connection is created between the first electronic device and a second electronic device via a wireless connection, method 100 further includes outputting or transmitting, by the first electronic device, a prompt message for prompting the second electronic device to perform identification of a network type (S103) and receiving an input or response to the prompt message from the second electronic device (S104). Further, the first network property is adjusted to a second network property corresponding to the second communication protocol (e.g., a low bandwidth protocol) or traffic pattern in a situation in which use of a cellular network by the second electronic device is identified; otherwise, the first electronic device continues using a network property corresponding to the first communication protocol (e.g., a high bandwidth protocol) or traffic pattern (S105).

For process S103, after a connection via WiFi is established between the first electronic device and the second electronic device, a prompt message is transmitted or output to the second electronic device. The prompt message is used for prompting a user to perform identification of a current network type. For example, the prompt message may be: "Please check the current network type of the device," among other example prompting messages that are possible and contemplated herein. After that, based on a response to the prompt message, the first network property may be adjusted to a second network property corresponding to the second communication protocol in which use of a cellular network of the second electronic device is identified; otherwise, use of the first network property corresponding to the first communication protocol continues. For example, if the network type selected by the user is a wired network, a network type acquired by each of the applications in the first electronic device is a wired network. If the network type selected by the user is a mobile network, a network type acquired by each of the applications in the first electronic device is a mobile network. After that, based on the network type selected by the user for the second electronic device, the current communication protocol of the first electronic device is controlled so that bandwidth loss of the second electronic device is reduced or avoided.

In some embodiments, instead of being selected by the user of the second electronic device, the network type corresponding to the wireless connection in the second electronic device may be set as a cellular network by default when the connection is established between the first electronic device and the second electronic device. Other solutions may be designed by those skilled in the art for adjusting the first network property to the network property corresponding to the second communication protocol.

Figure 4:
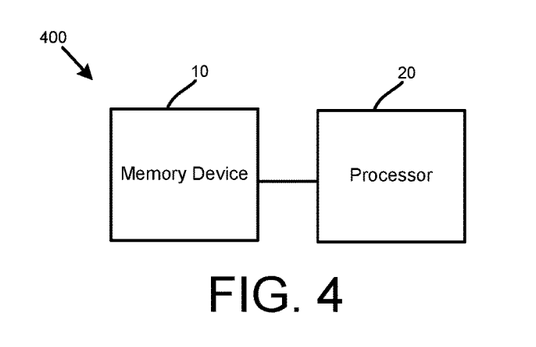
FIG. 4 is a block diagram of one embodiment of an electronic device providing a wireless hotspot.

Referring to FIG. 4, a block diagram of one embodiment of an electronic device 400 is shown. At least in the illustrated embodiment, electronic device 400 includes a memory device 10 and a processor 20 coupled to and in communication with the memory device 10.

Figure 5:
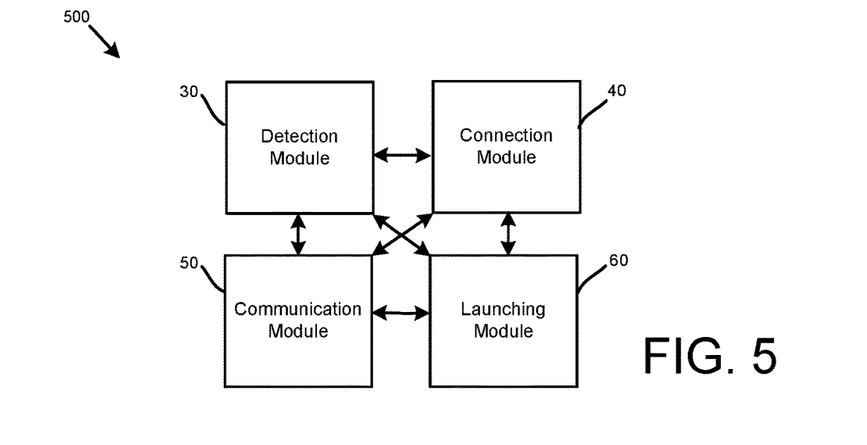
FIG. 5 is a block diagram of computer-readable modules included in the electronic device of FIG. 4.

The memory device 10 may be any type of memory device that is known or developed in the future that is capable of storing computer-readable data or instructions. In various embodiments, memory device 10 stores a detection module 30 that detects a wireless connection with another electronic device providing a wireless or mobile hotspot, a connection module 40 that determines if the other electronic device is connected to a cellular network, and a communication module 50, as shown in FIG. 5. In some embodiments, the connection module 40 may determine a network address associated with the processor 20 and can utilize the network address to identify use of the cellular network by the other electronic device as at least a portion of determining if the other electronic device is connected the cellular network.

The communication module 50 uses a communication protocol corresponding to the wireless connection based on the determination, is operable to communicate with the other electronic device utilizing network properties including respective communication protocols, and/or accesses one or more networks via the other electronic device. In various embodiments, the communication module 50 adjusts the communication protocol when the second other electronic device is connected to the cellular network and continues using the communication protocol when the second other electronic device is not connected to the cellular network. In some embodiments, the communication module 50 switches a network property used by the processor with the other electronic device as at least a portion of adjusting the communication protocol. In further embodiments, the communication module 50 replaces a first network property providing a first communication protocol with a second network property providing a second communication protocol as at least a portion of switching the network property. The first network property and the second network property may be different network properties and the second communication protocol can consume less bandwidth than the first communication protocol.

The communication module 50 may further determine a first network property for use with the other electronic device based on the application program and use the first network property to communicate with the other electronic device. In further embodiments, the communication module 50 replaces the first network property with a second network property that consumes less bandwidth than the first network property when the other electronic device is connected to the cellular network. The communication module 50 may further continue using the first network property when the other electronic device is not connected to the cellular network.

In further embodiments, the connection module 50 may further transmit, to the other electronic device, a prompt message via the network address for prompting the other electronic device to identify of a type of network connected to the other electronic device and receive, from the other electronic device, a response to the prompt message identifying the type of network connected to the other electronic device as at least a portion of utilizing the network address to identify use of the cellular network.

In some embodiments, memory device 10 can further store a launching module 60. The launching module 60 can launch an application program prior to the connection module determining if the other electronic device is connected to the cellular network.

Returning to FIG. 4, the processor 20 may be any processing device, hardware, or hardware/software combination that is known or developed in the future that is capable of executing computer-readable data and/or instructions. In various embodiments, the processor 20 can perform the instructions in the detection module 30, the connection module 40, the communication module 50, and the launching module 60 stored in memory device 10.

When performing the detection module 30, the processor 20 detects a wireless connection (e.g., a WiFi connection) with another electronic device (e.g., a device providing wireless hotspot). Further, the detection module 30 causes the processor 20 to determine a network address associated with the processor and can utilize the network address to identify use of the cellular network by the other electronic device as at least a portion of determining if the other electronic device is connected the cellular network. In addition, performing the connection module 40 causes the processor 20 to determine if the other electronic device is connected to a cellular network.

The communication module 50 causes the processor 20 to use a communication protocol corresponding to the wireless connection based on the determination obtain from the detection module. The communication module 50 is operable to enable the processor 20 to communicate with the other electronic device utilizing network properties including respective communication protocols, and/or to access one or more networks via the other electronic device.

In various embodiments, the communication module 50 causes the processor 20 to adjust the communication protocol (e.g., to a low bandwidth communication protocol) when the other electronic device is connected to the cellular network and continue using the same or original communication protocol (e.g., a high bandwidth communication protocol) when the other electronic device is not connected to a cellular network. In some embodiments, the communication module 50 causes the processor 20 to switch a network property used by the processor 20 with the other electronic device as at least a portion of adjusting the communication protocol. In further embodiments, the communication module causes the processor 20 to replace a first network property providing a first communication protocol with a second network property providing a second communication protocol as at least a portion of switching the network property. The first network property and the second network property may be different network properties and the second communication protocol can consume less bandwidth than the first communication protocol.

The communication module 50 may further cause the processor 20 to determine a first network property for use with the other electronic device based on the application program and use the first network property to communicate with the other electronic device. In further embodiments, the communication module 50 cause the processor 20 to replace the first network property with a second network property that consumes less bandwidth than the first network property when the other electronic device is connected to a cellular network. The communication module 50 may further cause the processor 20 to continue using the first network property when the other electronic device is not connected to the cellular network.

In further embodiments, the connection module 50 may further cause the processor 20 to transmit, to the other electronic device, a prompt message via the network address for prompting the other electronic device to identify of a type of network connected to the other electronic device and receive, from the other electronic device, a response to the prompt message identifying the type of network connected to the other electronic device as at least a portion of utilizing the network address to identify use of the cellular network.

The launching module 60 can cause the processor 20 to launch an application program. The application program may be launched prior to the connection module 40 causing the processor 20 to determine if the other electronic device is connected to a cellular network.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   detecting a wireless connection between a first electronic device and a second electronic device, wherein the second electronic device is connected to one of a cellular network and a non-cellular wireless network;
   determining whether the first electronic device is one of:
      connected to the cellular network via the second electronic device such that the first electronic device connects to the cellular network via the second electronic device, and
      connected to the non-cellular wireless network via the second electronic device such that the first electronic device connects to the non-cellular wireless network via the second electronic device;
   responsive to determining that the first electronic device is connected to the non-cellular wireless network via the second electronic device, utilizing a first communication protocol with the wireless connection; and
   responsive to determining that the first electronic device is connected to the cellular network via the second electronic device, utilizing a second communication protocol that consumes less bandwidth than the first communication protocol with the wireless connection.

2. The method of claim 1, wherein utilizing the second communication protocol comprises adjusting a network property of the first electronic device.

3. The method of claim 2, wherein:
   adjusting the network property comprises replacing a first network property providing the first communication protocol with a second network property providing the second communication protocol.

4. The method of claim 1, further comprising:
   launching a first application program in the first electronic device;
   determining a first network property of the first electronic device for use with the second electronic device based on the first application program; and
   using the first network property of the first electronic device to communicate with the second electronic device.

5. The method of claim 4, further comprising:
   replacing the first network property of the first electronic device with a second network property that consumes less bandwidth responsive to the second electronic device being connected to the cellular network.

6. The method of claim 1, wherein determining whether the second electronic device is connected to the cellular network comprises:
   determining a network address of the first electronic device; and
   utilizing the network address to determine whether the network address corresponds to the cellular network.

7. The method of claim 6, wherein utilizing the network address comprises:
   transmitting, by the first electronic device to the second electronic device, a prompt message for prompting the second electronic device to identify a type of the network to which the second electronic device is connected; and
   receiving, by the first electronic device from the second electronic device, a response to the prompt message identifying the type of network to which the second electronic device is connected.

8. An apparatus, comprising:
   a processor; and
   a communication module coupled to the processor, wherein the communication module is connected to one of a cellular network and a non-cellular wireless network,
   wherein the processor is operable to:
      detect a wireless connection between the communication module and an electronic device;
      determine whether the electronic device is one of:
         connected to the cellular network via the communication module such that the electronic device connects to the cellular network via the communication module, and
         connected to the non-cellular wireless network via the communication module such that the electronic device connects to the non-cellular wireless network via the communication module;
      responsive to determining that the electronic device is connected to the non-cellular wireless network via the communication module, utilizing a first communication protocol with the wireless connection; and
      responsive to a determination that the electronic device is connected to the cellular network via the communication module, utilizing a second communication protocol that consumes less bandwidth than the first communication protocol with the wireless connection.

9. The apparatus of claim 8, wherein the communication module is configured to adjust a network property of the communication module in relation to the wireless connection between the communication module and the electronic device.

10. The apparatus of claim 9, wherein:
    the communication module is configured to replace a first network property providing the first communication protocol with a second network property providing the second communication protocol; and
    the second communication protocol consumes less bandwidth than the first communication protocol.

11. The apparatus of claim 8, wherein:
    the processor is further configured to launch an application program; and
    the communication module is further configured to:
       determine a first network property for use with the electronic device based on the application program, and
       use the first network property to communicate with the electronic device.

12. The apparatus of claim 11, wherein the communication module is configured to replace the first network property with a second network property that consumes less bandwidth responsive to the electronic device being connected to the cellular network.

13. The apparatus of claim 8, wherein the processor is operable to:
    determine a network address; and
    utilize the network address to determine whether the network address corresponds to the cellular network of the electronic device to which the communication module connects.

14. The apparatus of claim 13, wherein the communication module is configured to:

receive, from the electronic device, a prompt message to prompt the communication module to identify a type of network to which the communication module connects; and transmit, to the electronic device, a response to the prompt message identifying the type of network to which the communication module connects.

15. A computer program product comprising a computer-readable storage medium including program instructions embodied therewith, the program instructions executable by a processor of a first electronic device to cause the processor to:

detect a wireless connection between the first electronic device and a second electronic device, wherein the second electronic device is connected to one of a cellular network and a non-cellular wireless network;

determine whether the first electronic device is one of:
connected to the cellular network via the second electronic device such that the first electronic device connects to the cellular network via the second electronic device, and
connected to the non-cellular wireless network via the second electronic device such that the first electronic device connects to the non-cellular wireless network via the second electronic device;

responsive to determining that the first electronic device is connected to the non-cellular wireless network via the second electronic device, utilizing a first communication protocol with the wireless connection; and responsive to a determination that the first electronic device is connected to the cellular network via the second electronic device, utilizing a second communication protocol that consumes less bandwidth than the first communication protocol with the wireless connection.

16. The computer program product of claim 15, wherein utilizing the second communication protocol comprises adjusting a network property of the first electronic device.

17. The computer program product of claim 16, wherein:
adjusting the network property comprises replacing a first network property providing the first communication protocol with a second network property providing the second communication protocol.

18. The computer program product of claim 15, wherein the processor is further configured to:
launch a first application program in the first electronic device;
determine a first network property of the first electronic device for use with the second electronic device based on the first application program; and
use the first network property of the first electronic device to communicate with the second electronic device.

19. The computer program product of claim 18, wherein the processor is further configured to:
replace the first network property of the first electronic device with a second network property that consumes less bandwidth responsive to the second electronic device being connected to the cellular network.

20. The computer program product of claim 15, wherein:
determining whether the second electronic device is connected to the cellular network comprises:
determining a network address of the first electronic device, and
utilizing the network address to determine if the network address corresponds to the cellular network; and
utilizing the network address comprises:
transmitting, by the first electronic device to the second electronic device, a prompt message for prompting the second electronic device to identify a type of the network to which the second electronic device is connected, and
receiving, by the first electronic device from the second electronic device, a response to the prompt message identifying the type of network to which the second electronic device is connected.

* * * * *